(12) United States Patent
Munson, Jr.

(10) Patent No.: US 8,858,149 B2
(45) Date of Patent: Oct. 14, 2014

(54) REMOTE DOCKING PORT

(76) Inventor: David Murray Munson, Jr., Dallas, TX (US)

( * ) Notice: Subject to any disclaimer, the term of this patent is extended or adjusted under 35 U.S.C. 154(b) by 1676 days.

(21) Appl. No.: 12/227,755

(22) PCT Filed: May 31, 2007

(86) PCT No.: PCT/US2007/012829
§ 371 (c)(1),
(2), (4) Date: Aug. 24, 2009

(87) PCT Pub. No.: WO2008/094171
PCT Pub. Date: Aug. 7, 2008

(65) Prior Publication Data
US 2009/0317212 A1 Dec. 24, 2009

Related U.S. Application Data

(60) Provisional application No. 60/810,044, filed on Jun. 1, 2006.

(51) Int. Cl.
*B63B 27/00* (2006.01)
*B63B 35/44* (2006.01)

(52) U.S. Cl.
CPC . *B63B 35/44* (2013.01); *Y02E 10/38* (2013.01)
USPC .................. 414/138.1; 414/137.9; 414/140.3; 114/259; 405/3; 405/76

(58) Field of Classification Search
CPC ...... B63B 27/30; B63B 27/34; B63B 35/003; B63B 35/42; B63B 2035/4466; B63B 2035/4473; B63B 2039/105; B63B 35/44; B63B 27/32; B63B 25/006; B63B 27/00; B63B 27/02; B63B 27/12; B65G 63/00; B65G 63/004; B65G 67/60; Y02E 10/38; B63C 1/00; B63C 1/02; B63C 1/06; B63C 7/16; B63C 7/24; F03B 13/14; F03B 13/142; F03B 13/145
USPC .......... 414/137.1, 137.9, 138.1, 138.2, 137.4; 114/258–260, 72; 405/3, 4
See application file for complete search history.

(56) References Cited

U.S. PATENT DOCUMENTS

| 2,375,286 | A | * | 5/1945 | Creed | 114/265 |
| 3,412,876 | A |   | 11/1968 | Calabrese |  |
| 3,587,505 | A | * | 6/1971 | Wells | 114/26 |
| 3,707,934 | A | * | 1/1973 | Frankel | 114/258 |
| 3,785,314 | A | * | 1/1974 | Scanlan | 114/266 |
| 3,826,384 | A | * | 7/1974 | Cecce | 414/138.1 |
| 4,123,667 | A | * | 10/1978 | Decker | 290/53 |
| 4,413,956 | A |   | 11/1983 | Berg |  |

(Continued)

*Primary Examiner* — Gregory Adams
*Assistant Examiner* — Lynn Schwenning
(74) *Attorney, Agent, or Firm* — D. Scott Hemingway; Hemingway & Hansen, LLP

(57) ABSTRACT

This invention is a floating docking port that allows ships to dock within the port structure and be loaded, unloaded, and refueled, while converting the energy generated from wave motion into a usable source of power. The docking port isolates the vessels from waves and adverse sea currents, which allows for more effective cargo transfer. The docking port is extremely large and functions as a storage and distribution center for naval vessels. The loading and unloading of cargo and containers is accomplished by a container handling system that utilizes hoists, railed carriages, and cargo elevators to facilitate efficient loading and unloading of containers.

20 Claims, 14 Drawing Sheets

(56) References Cited

U.S. PATENT DOCUMENTS

| | | | |
|---|---|---|---|
| 4,615,289 A | 10/1986 | Bloxham | |
| 4,984,935 A * | 1/1991 | de Oliveira Filho et al. | 405/224 |
| 5,215,024 A * | 6/1993 | McAllister | 114/45 |
| 5,347,944 A * | 9/1994 | Dupre et al. | 114/77 R |
| 5,666,898 A * | 9/1997 | Bell | 114/54 |
| 5,913,278 A * | 6/1999 | Mitchell | 114/45 |
| 6,334,401 B1 * | 1/2002 | Sridhar | 114/256 |
| 6,477,968 B2 * | 11/2002 | Powell | 114/46 |
| 6,524,050 B1 | 2/2003 | Arntzen et al. | |
| 6,834,604 B2 * | 12/2004 | O'Neil et al. | 114/44 |
| 6,912,965 B2 | 7/2005 | Leitch et al. | |
| 7,654,211 B2 * | 2/2010 | Maloney et al. | 114/67 R |
| 2004/0163387 A1 * | 8/2004 | Pineda | 60/495 |
| 2005/0123353 A1 * | 6/2005 | Dick | 405/75 |
| 2006/0086304 A1 * | 4/2006 | Menard | 114/259 |
| 2007/0000419 A1 * | 1/2007 | Millheim et al. | 114/44 |
| 2007/0009325 A1 * | 1/2007 | Oigarden et al. | 405/75 |

* cited by examiner

REMOTE DOCKING PORT

RELATED APPLICATION DATA

This application is related to U.S. Provisional Patent Application Ser. No. 60/810,044 filed on Jun. 1, 2006, and priority is claimed for this earlier filing under 35 U.S.C. §120. The Provisional Patent Application is also incorporated by reference into this utility patent application.

TECHNICAL FIELD OF THE INVENTION

An apparatus and method for concurrently loading and unloading cargo at an offshore docking port from multiple oceangoing vessels.

BACKGROUND OF THE INVENTION

The concept of using floating islands to conduct a variety of at-sea functions is not a recent development. However, a comprehensive structure that allows large and small vessels alike to simultaneously dock at an offshore docking port that is designed to efficiently conduct necessary cargo transfer and fueling operations, while capturing wave energy and converting it to usable power, has yet to be effectively implemented.

The significance and advantages of being able to efficiently transfer large amounts of cargo between ships without requiring docking at overseas ports is constantly growing. The planned attack on the U.S.S. The Sullivans and the executed attack on the U.S.S. Cole have demonstrated a the need for secure offshore docking and refueling stations that are less susceptible to attacks by small vessels and easier to secure and monitor. The political climate in many locations has also made the presence of land-based foreign military bases more difficult and expensive to maintain than was the case in the past.

A problem in implementing such off-shore operation as been cargo transfers. One of the main challenges for such an implementation for cargo transfers has been the presence of natural ocean currents and waves disrupting cargo operations and often causing damage to docked or docking ships or endangering personnel involved. Not only is the docking ship subject to the waves, but a floating docking port will also be affected. The challenge presented is compounded by the fact that waves will have different effects on the motion of the docking vessels compared to the docking port, making cargo transfer more difficult than when a ship is docked at a land-based port, generally located in the calm waters of a natural or man-made harbor. In a land-based port, the docking facility is also generally stationary.

The implementation of man-made artificial islands or similar structures to effectuate vessel docking, cargo transfers, refueling, and storage has been hampered by the effects of waves acting upon such floating ports. No method has been introduced that has been effective in dampening the effects of waves that can have a variety of adverse consequences to the port or to docked vessels. Providing a stable work platform that floats on open ocean surfaces is a main objective of this invention. Also, the concern that such an installation would be particularly susceptible to destruction by way of a torpedo, bomb, or missile attack has hindered development in this area for military use.

Large dockside or smaller ship-mounted cranes are generally used to load and unload cargo and cargo containers onto and off of naval or civilian transport vessels. The cycle time for unloading these vessels in this manner delays the loading or unloading vessel and delays vessels waiting to dock and load or unload. The use of multiple cranes does not completely alleviate this inefficiency and will often create its own inefficiencies or dangerous conditions associated with the lack of coordinated efforts among crane operators.

The present invention solves these problems and uses a large docking port for vessels for military and commercial cargo transfer and refueling. Furthermore, this invention can incorporate a wave energy converter system that allows the docking port to convert wave energy into usable power.

SUMMARY OF THE INVENTION

The invention is a large floating docking vessel that efficiently facilitates the transfer and both temporary and long term storing of cargo from docked vessels. Large freight ships are able to dock within the floating port and are isolated from sea waves while docked by securing the ship within an isolating water enclosure such that the water level within can be slightly raised above sea level once the ship has moved into the docking area.

Independently suspended flotation units along the sides of the docking port provide much of the vessel's buoyancy. The flotation units act to provide stabilization to the docking port as the suspension allows a constant lift to the vessel regardless of wave action. The primary stabilization method for the docking port is variable depending on the conditions of the sea bed and the mobility considerations.

It is envisioned that the docking vessel may provide the equivalent of a 50-acre conventional warehouse through the use of computer-controlled, three-dimensional warehouse technologies and automated transfer systems. The unloading and loading of cargo is integrated into these systems and made more efficient by utilizing an overhead hoisting and transport system as well as effective organization and tracking of loaded and unloaded cargo. Both containerized and uncontainerized cargo can be efficiently tracked and moved between storage locations and cargo ships.

The invention not only provides for stabilization from waves and other adverse weather conditions, but also is able to capture energy from the waves and convert it to usable power. Independent suspension cylinders that can be located at the sides of the docking port are actuated by incoming waves. The cylinders then pump water or another fluid into reservoirs, which is then transformed into usable energy by powering a turbine generator.

DETAILED DESCRIPTION OF THE PREFERRED EMBODIMENTS

The preferred embodiment of this invention is an offshore, floating, all-weather, docking port where multiple large and small ships dock to load and unload cargo and refuel. The docking port can be extremely large depending on the nature and quantity of cargo containers or pallets sought to be deposited or temporarily stored on the port. The size of the port would have a greater capacity to hold more containers than any one ship so that containers can be loaded and unloaded simultaneously, while also performing the same functions with regards to smaller vessels. The invention is designed to allow the largest container-carrying vessel to dock within the interior docking area of the docking port where it can be loaded, unloaded, and refueled in the shortest amount of time. Independent flotation units provide stabilization to the docking port as a whole. The softwalled enclosure 120 is lowered underwater sufficiently to allow a freight ship to travel over its upper edge and move into or leave the docking area. When the softwalled enclosure is raised it isolates the vessel from waves, weather and many war threats. The units are large enough to function well in adverse tidal conditions and are unlikely to move at all in calmer waters.

Figure 1:
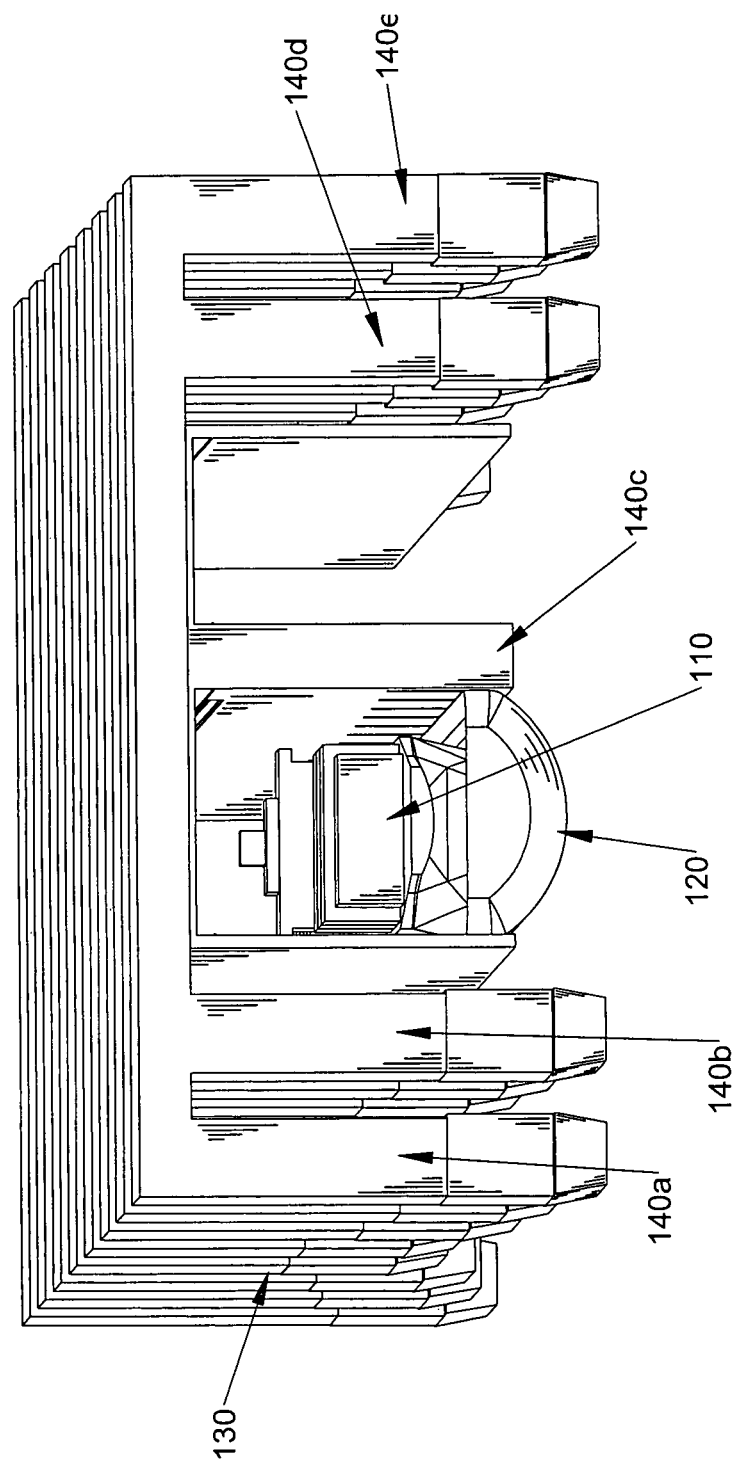
FIG. 1 shows a large container ship docked at a floating docking port in a separate, soft-walled enclosure that insulates it from the ocean currents and waves.
Figure 2:
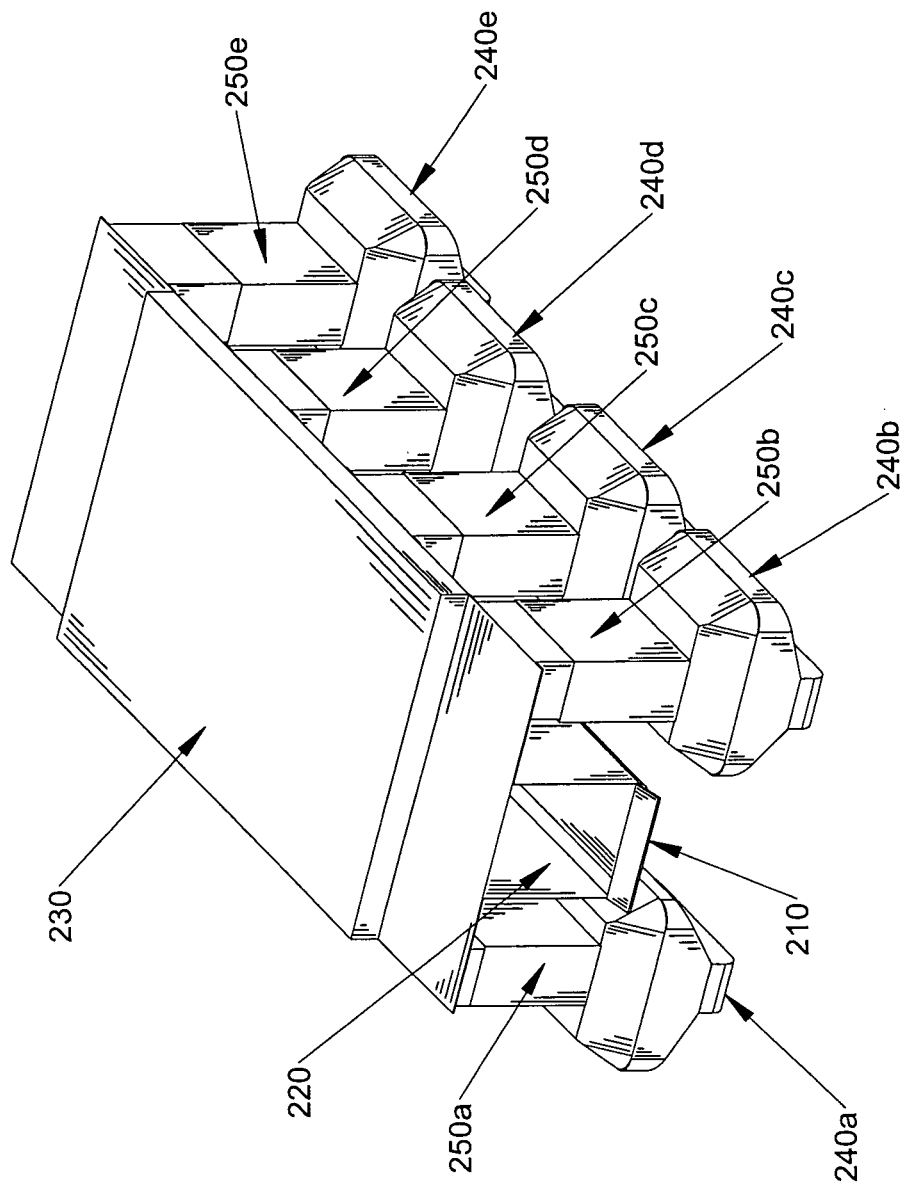
FIG. 2 is a variation of the embodiment of the invention shown in FIG. 1 that utilizes gates to isolate docking ships from the waves once it has entered into the interior of the docking vessel.

As shown in FIG. 1, each docking area is equipped with a submersible water enclosure 120 to allow a docked vessel 110 to be isolated from large sea waves. The vessel can independently enter into the docking area or be drawn into proper positioning by the use of a tugboat that can either remain in the docking port or emerge from the docking port from the other side. The enclosure can either be comprised of solid walls, floor, and a watertight gate (as shown in FIG. 2) or be a soft-walled enclosure 120 that is lifted into the air by the mobile dock. Either method creates a shelter for the docked vessel in much the same way that a traditional land-based port provides protection to such vessels. The enclosure is lowered underwater to allow a freight ship to be moved into or to leave the docking area.

Also shown in FIG. 1 is one embodiment of a sequential pump system that utilizes staggered freight holds 130 that incorporate a sequential wave pump piston system to capture the wave energy. The large freight holds that incorporate the pistons are staggered to sequentially pump water or another fluid, which can pumped up to the top deck to supply water or another fluid to a turbine, for instance. The combination of individual freight holds 130 forms the walls 140a-140e of the docking port structure so that every part of the docking port can be used to generate energy in this embodiment of the invention. FIG. 1 shows the "double hull" design with a water gap between the interior of the port and the shell. The wave pump system of the cargo holds is designed as a displacer or piston that floats in fluid trapped inside the inner shell of the flotation element. When a wave forces the piston upward, the fluid inside between the cargo hold wall and the close fitted wall of the piston chamber is displaced upward rapidly. The rising fluid is allowed to exit the chamber at a desired level substantially above its resting level. When the wave passes the piston drops down and additional water admitted before another wave repeats the cycle. The freight holds themselves are spaced out so that a successful torpedo attack may destroy one or more freight holds depending on the force and impact point, but would not materially harm the overall structure of the docking port.

FIG. 2 shows an alternative embodiment of the invention that utilizes watertight gates to "capture" incoming vessels. Once a ship enters the docking area 220, the watertight gate 210 closes to isolate the ship from the ocean waters. Water can then be pumped into the dock to raise the ship or a hoist system can lift the dock to a level above the ocean surface. In this embodiment, the containers are stored in the container storage area 230 that is located at the top levels of the docking port and in the freight holds that are located in the pillars 250a-250e that form the vertical support of the structure. Large independent flotation units 240a-240e comprise the base of the docking port and are used to provide stabilization.

Once the ship is positioned correctly, the gate will be sealed enclosing both the ship and a quantity of water captured within the enclosure formed into an elongated wave pan. Water can then be pumped into the sealed enclosure to lift the enclosed water and ship very slightly. This slightly higher elevation with the enclosure keeps the gates sealed and further stabilizes the docking vessel by creating a downward force on the mobile dock. The tension on the mobile dock that acts to pull upward on the enclosure stabilizes the docked ship regardless of the outside sea conditions. Each inch that the water enclosure is raised above sea level creates approximately 12,400 tons of downward stabilizing force, which has the effect of stabilizing all of the docked vessels. Since the goal is a stationary vessel, the cargo hold/displacers or other displacement structures are intended to allow only a limited flotation force to be transmitted to the vessel structure.

Figure 3:
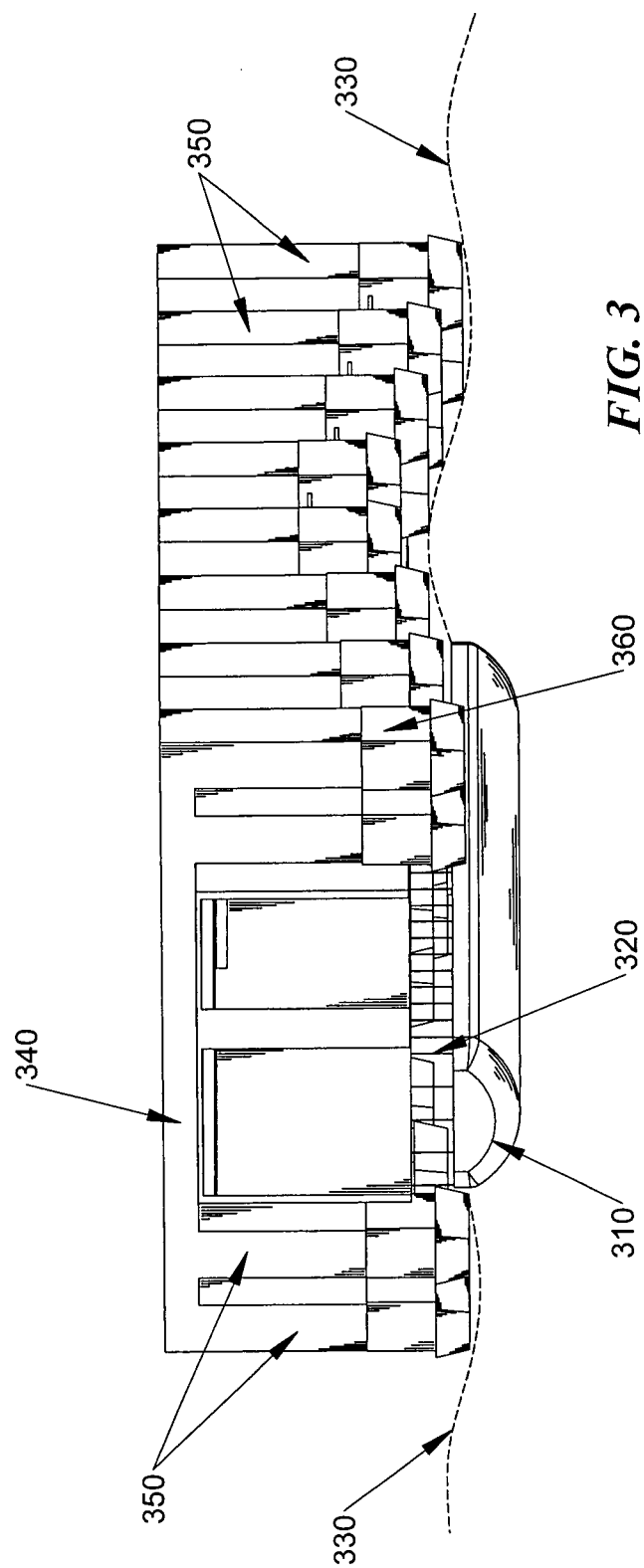
FIG. 3 is a perspective view of the docking port that shows the docking position of vessels and the lifting cables used to lift the water enclosure up above sea level, and it features an overview of the flotation and wave pumps as well as storage areas within the port.

As shown in FIG. 3, once the vessel is correctly positioned in the docking area, the wave pan 310 is then raised using lifting cables 320 until the upper rim of the wave pan 310 is above the height of any surrounding waves 330. The lifting cables 320 around the edges allow the wave pan to be put in tension-minimizing wave interaction to contribute to docking vessel stabilization. Water within the wave pan 310 is allowed to drain until the desired height of the wave pan 310, relative to the waves, is attained. FIG. 3 shows the horizontal storage area 340 located on the top of the docking port. This perspective view also shows the vertical storage areas 350, where the wave pump pistons are located, and the flotation and wave pump that is located at the corners of the docking port in this embodiment.

Figure 4:
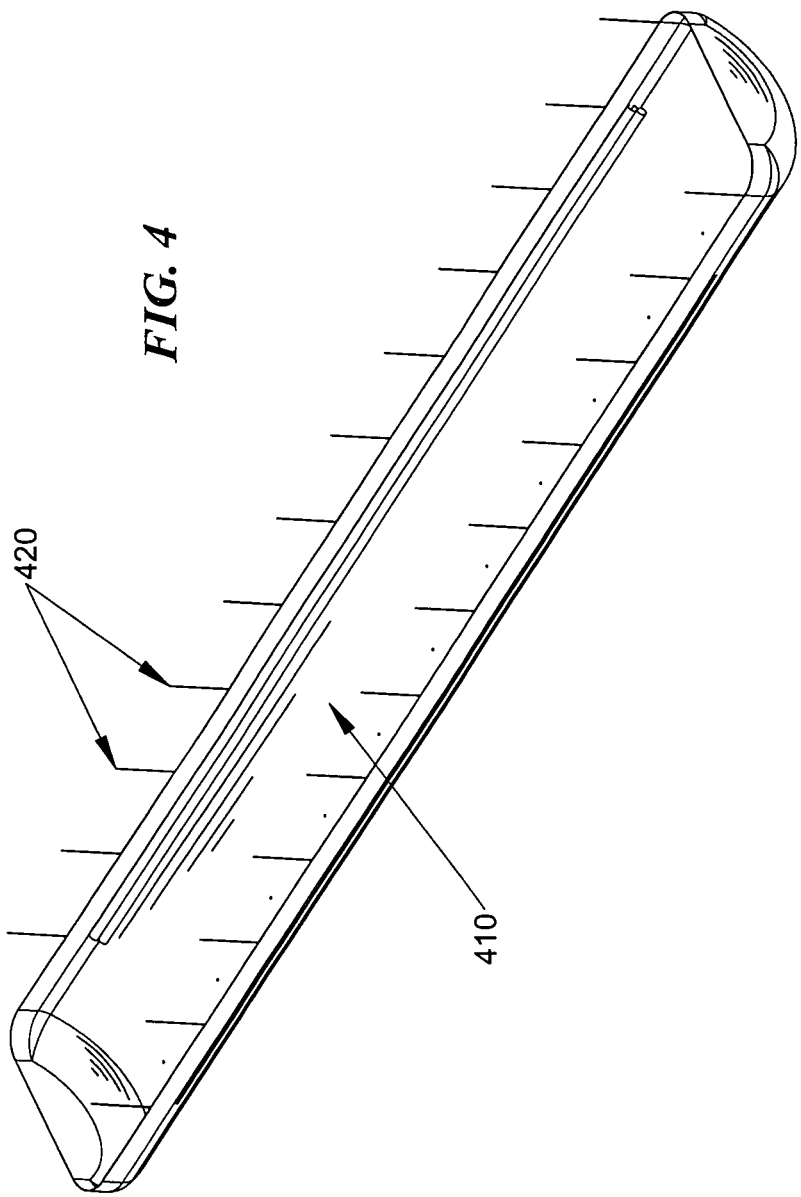
FIG. 4 shows an individual view of the large vessel wave pan in which seagoing vessels are captured.

The individual large vessel wave pan is shown in FIG. 4. The wave pan 410 is raised up once a vessel comes completely within the perimeter of the docking area. The wave pan 410 is raised through the use of lifting cables 420 that are attached to the edge of the wave pan 410.

Figure 5:
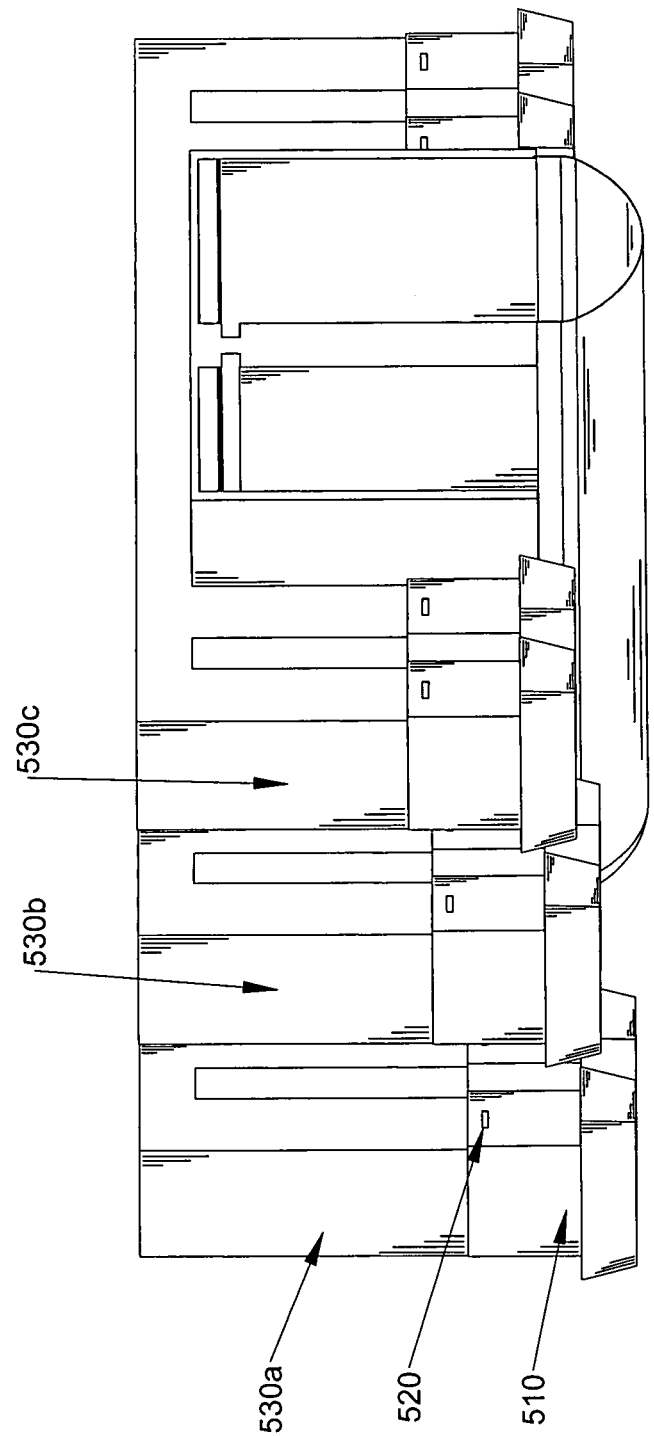
FIG. 5 is a close up view of the flotation and wave pump shown in FIG. 3.

A close up view of the flotation and wave pump is shown at FIG. 5. As excess water is drained from the discharge port 520, it accumulates in the wave pump 510 and is used to generate usable power to the docking port. The wave pump piston can be located at the bottom of the staggered freight holds 530a-530c that form the walls of the docking port structure.

Figure 6:
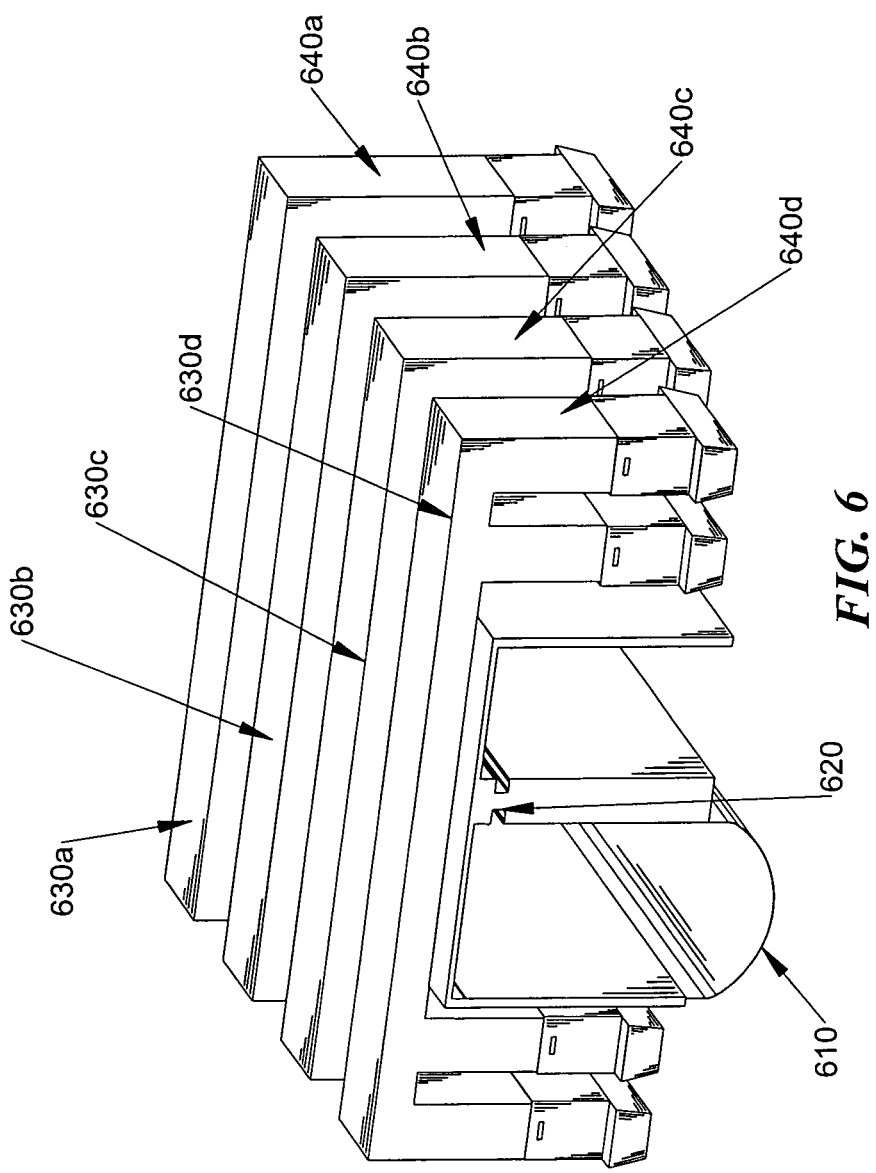
FIG. 6 is another view of the docking port that shows the rail track in relation to the wave pan and the docked vessel.

Another view of the docking port is shown in FIG. 6. The inflatable bladder 610 provides lift and is completely contained within the docking port and its designated docking area. Once the vessel is captured within the wave pan, unloading and loading of the vessel can begin. The overhead rail system is integral to the walls along the docking area. Movement along the length of the vessel is accomplished by an overhead frame system that allows each hoist apparatus to travel along the longitudinal rail 620 that is built into the walls along the docking area. The freight can be stored in either the horizontal freight holds 630a-630d or in the vertical freight holds 640a-640d that form the walls of the docking port structure.

Using computer-controlled three-dimensional warehouse technologies currently available maximizes storage efficiency and requires few actual operators to process large quantities of cargo containers or pallets. Adjustable holding floors integrated into the cargo transfer system can be used to store containers and are moved up or down in order to efficiently facilitate ship loading and unloading. An objective of system design is to minimize crane transport distance while keeping containers organized for efficient handling.

Figure 7:
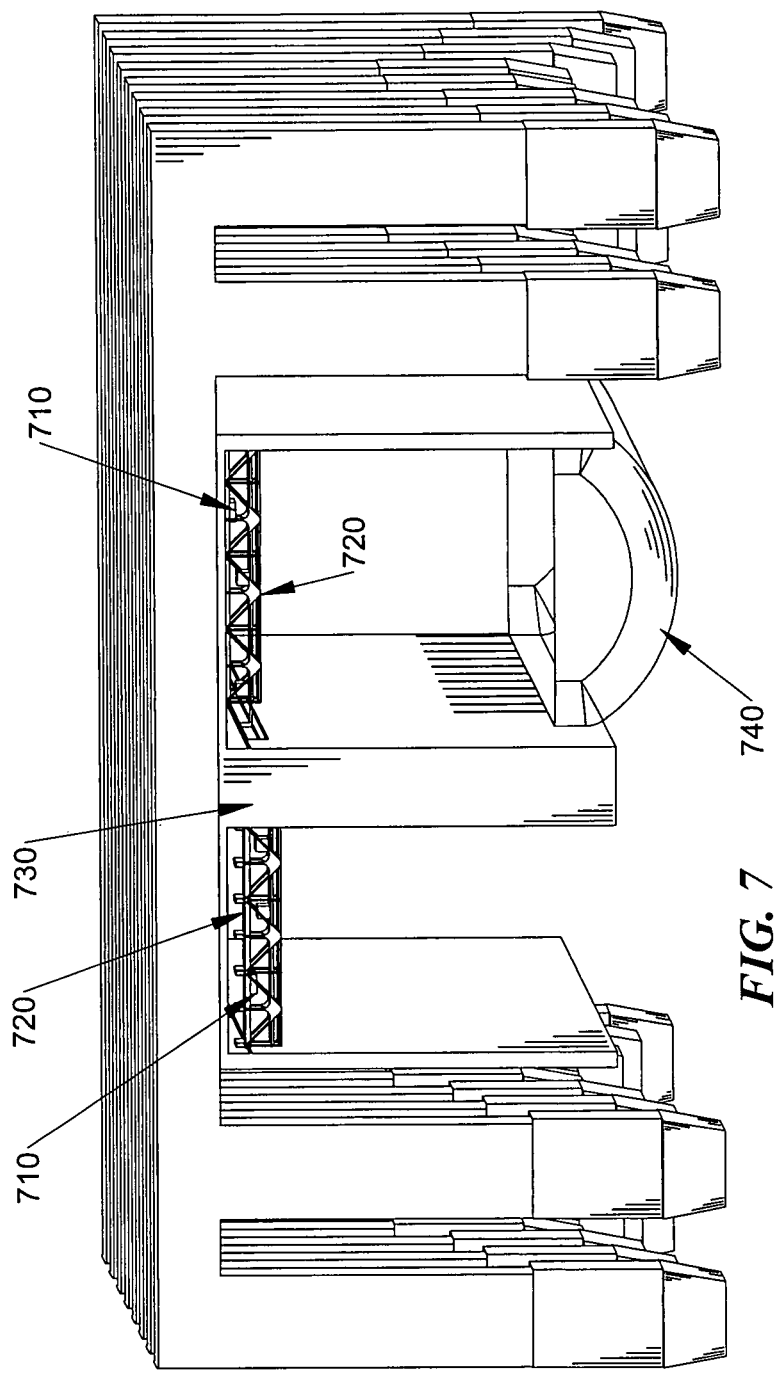
FIG. 7 is a frontal view of the docking port that illustrates the location of the overhead truss apparatus upon which the hoists that lift containers off of the docked ships and onto the container carriages are mounted.

FIG. 7 shows one embodiment of the loading and unloading system includes the use of multiple lifting hoists 710 that are mounted to an overhead truss apparatus 720. The truss is the overhead freight handling system generally spanning most or all of the lateral width of the docking enclosure. Cargo handling could include a fixed part of the vessel and have adjacent rail systems mounted in the ceiling of the docking enclosure. Each hoists 710 should move longitudinally enough to attach to containers in two rows across the width of the ship. Once the vessel is captured in the water pan 740, the hoists 710 lift containers vertically into the overhead container handling apparatus 720. This is envisioned as a minimum distance off the ship. The containers are then lowered directly onto an elevated railed carriage system that is integral to the overhead truss apparatus. This is in contrast to the traditional unloading method where cargo containers are lifted off of the ship and placed next to the ship for subsequent handling. In this way, the unloading and loading cycle times are greatly reduced as moving directly to the railed carriage system eliminates a cargo handling step and also eliminates most horizontal crane movements and the resulting need to minimize cable side swing with slow movement. This greatly reduces the total docking time necessary for cargo transfer operations. In certain situations requiring extra fast unloading the docking port can be equipped with as many overhead container handling systems as needed to provide the desired unloading rate.

The container is lifted a minimal distance off of the ship and placed immediately onto the elevated railed carriage system, which transports the cargo to the storage or other unloading area. Further, as certain cargo areas of a ship are emptied as a result of unloading, reloading operations can begin to concurrently load outbound cargo onto the ship.

Loading and unloading can take place from either or both sides of the ship as cranes, conveyors, and the rail system are designed to operate from both starboard and port sides of the ships. In certain situations, cargo containers can be unloaded from one vessel and be transferred through the center staging area 730 to be loaded onto a vessel docked in an adjacent station. In certain situations requiring extra fast unloading, the docking port can be equipped with as many overhead container handling systems as needed to provide the desired unloading rate. In order to support an active theater of operation in a military conflict, an entire full size container ship can be unloaded, reloaded, and refueled in less than a day. In such a case, the entire ceiling of the docking bay could accommodate several individual overhead container handling systems to serve one or two lateral rows of containers with multiple hoists removing and reloading containers safely and efficiently.

Figure 8:
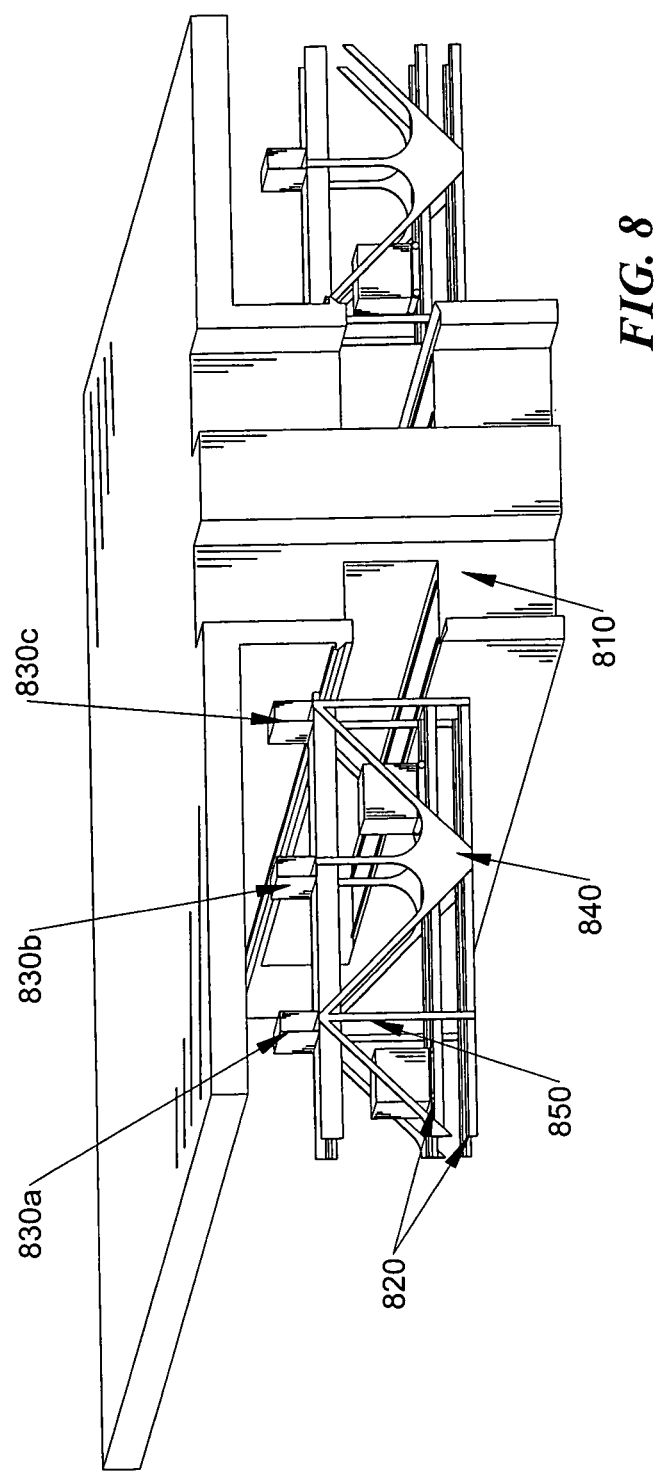
FIG. 8 is a close-up view of the overhead truss apparatus with the rail track along which the hoist system travels laterally along the length of the docked vessel.

FIG. 8 shows one embodiment of the system in which the railed carriages ride off of the overhead truss apparatus and onto a vertical elevator 810 to be stored or staged as necessary. The structural support for the truss apparatus consists of supporting cross members 830a-830c and both standard struts 850 and v-shaped struts 840.

Figure 9:
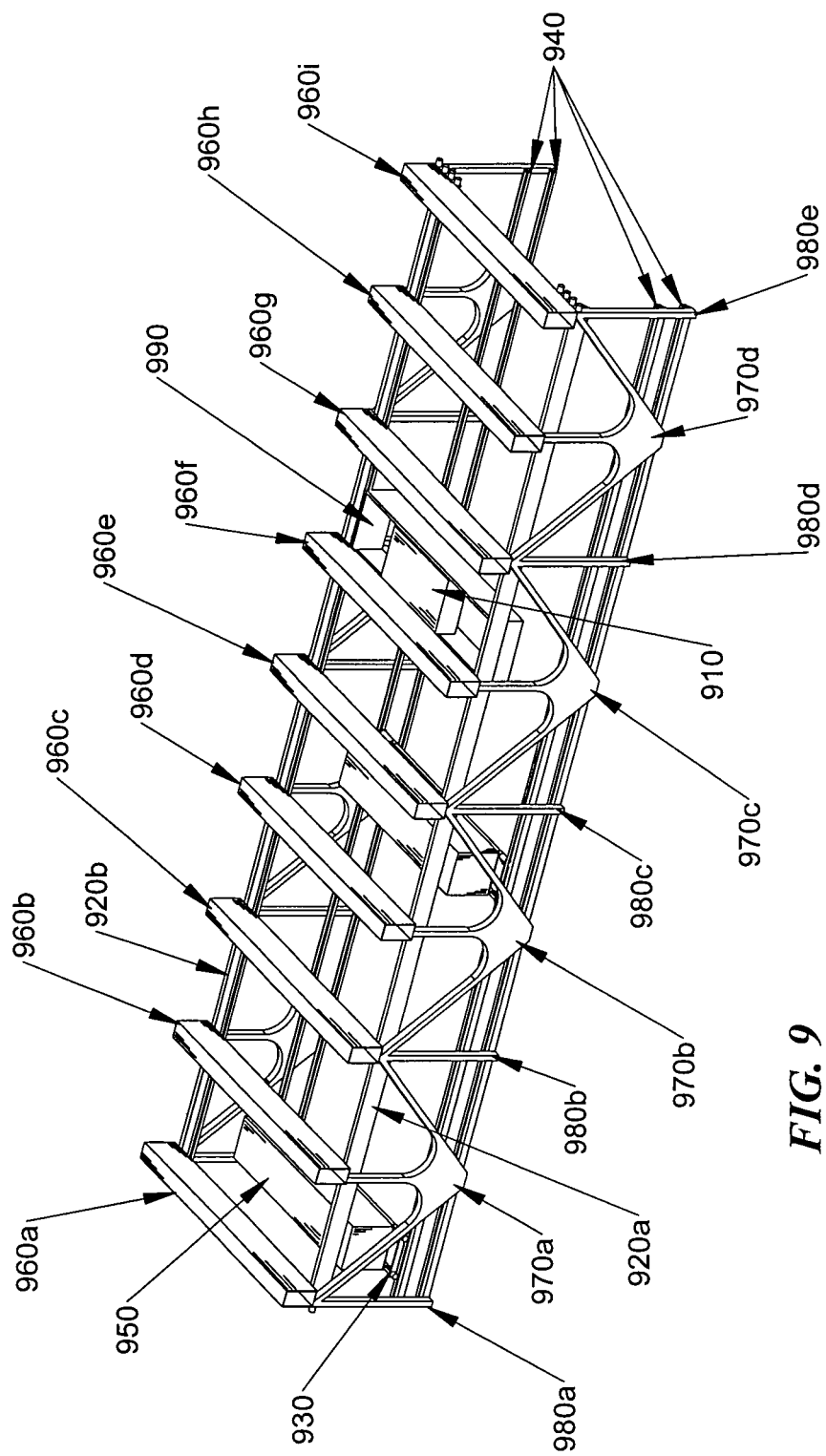
FIG. 9 is an overhead view of the overhead truss apparatus that lifts cargo containers off of a docked ship and deposits them on container carriages that move along parallel rails located on the hoist structure.

One embodiment of the overhead cargo transfer system is shown in FIG. 9. The system consists of an open-bottomed truss apparatus upon which is mounted a hoist assembly 910 that rides on lateral rails 920a-920b located on the upper portion of the frame. The overhead truss apparatus includes a parallel set of horizontal rails 940 that support railed carriages 930 which transport the containers 950 to storage and staging areas after the hoist 910 and the hoist supporting frame 990 deposit the containers onto the railed carriages 930. Structural support is provided by supporting cross members 960a-960i, each of which is connected to the lateral rails 920a-920b, which are in turn supported by a combination of v-shaped vertical struts 970a-970d and standard vertical struts 980a-980e that comprise the sides of the overhead cargo transfer system. The overhead cargo transfer system allows for longitudinal movement of the entire assembly along the length of the docked vessel. Hoists and carriages move independently and move along parallel rail systems, but operate on different planes of the overhead truss apparatus.

Figure 10:
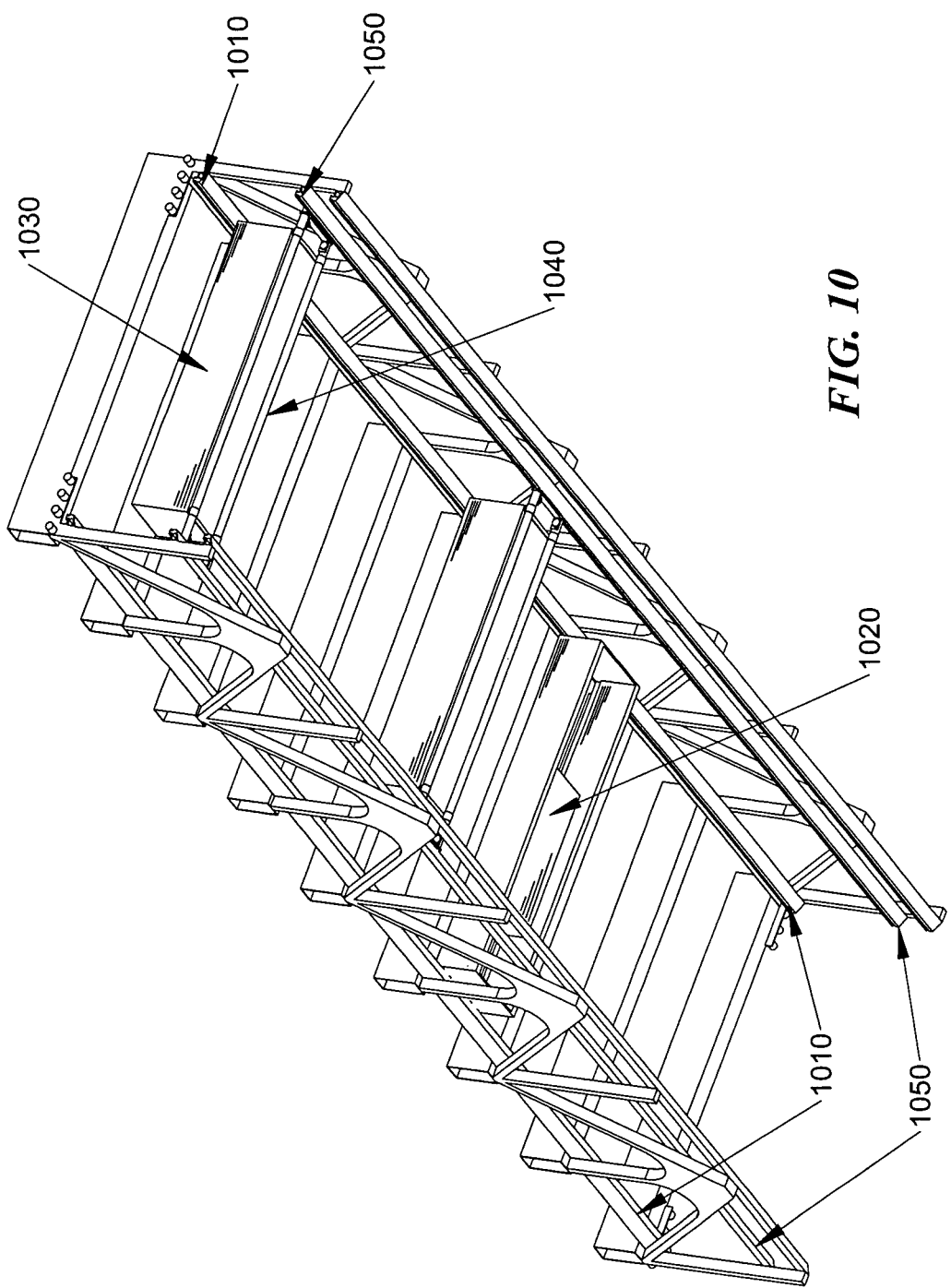
FIG. 10 is a view of the overhead truss apparatus from underneath.

FIG. 10 is a view from underneath the overhead truss apparatus shown in FIG. 9. When the hoist unit 1020 riding along the lateral rails 1010 has lifted a container 1030 up to a predetermined point, a railed carriage 1040 rolls along the carriage rails 1050 until it positions underneath the container 1030, at which point the hoist uncouples and the container is deposited on the carriage 1040. The carriage then transports the container to an elevator unit to be processed (stored or staged) and the hoist returns to the cargo hold of the docked vessel to process the next container.

Figure 11:
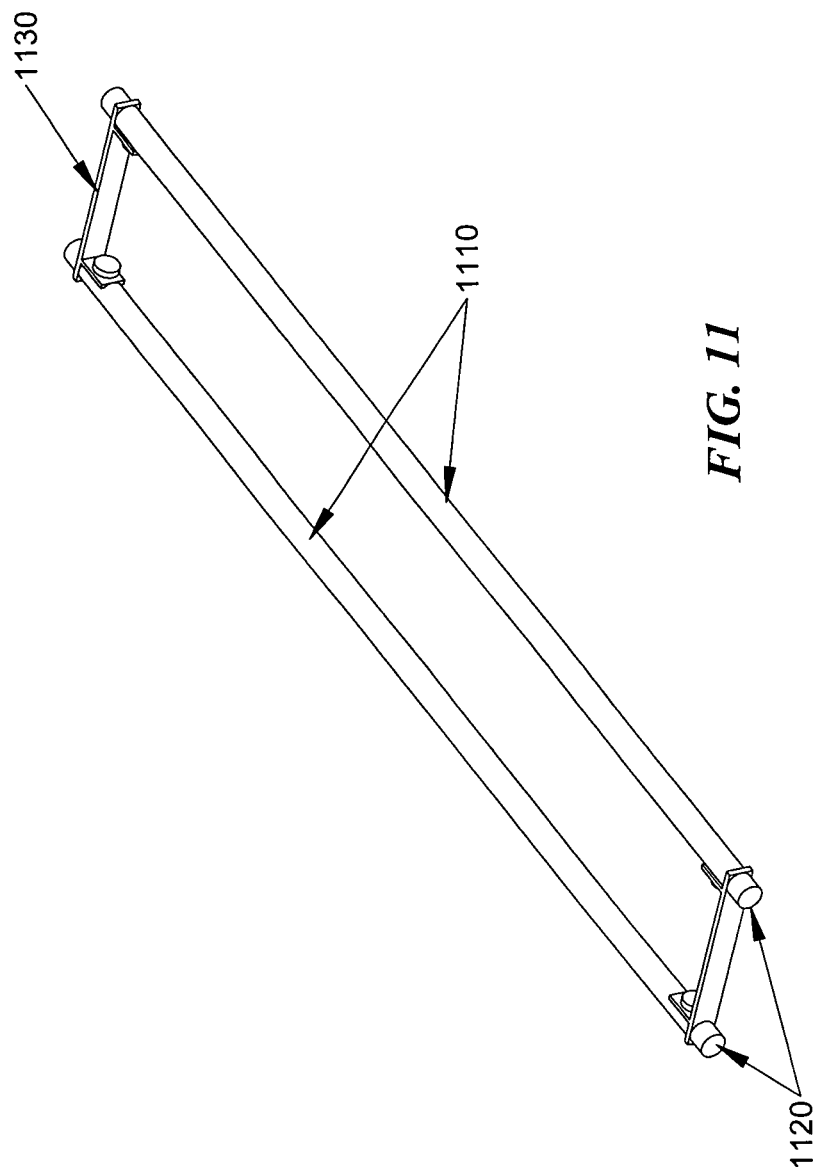
FIG. 11 shows an individual view of a container rail carriage bottom.

FIG. 11 shows one embodiment of the base of a railed carriage. The lengthwise structural bars 1110 support the weight of the offloaded container. The end fittings 1120 located at the ends of the structural bars 1110 engage the steel tracks that move the railed carriages laterally along the overhead truss structure. The wedge fittings 1130 maintain proper alignment and structural support of the rail carriages.

Figure 12:
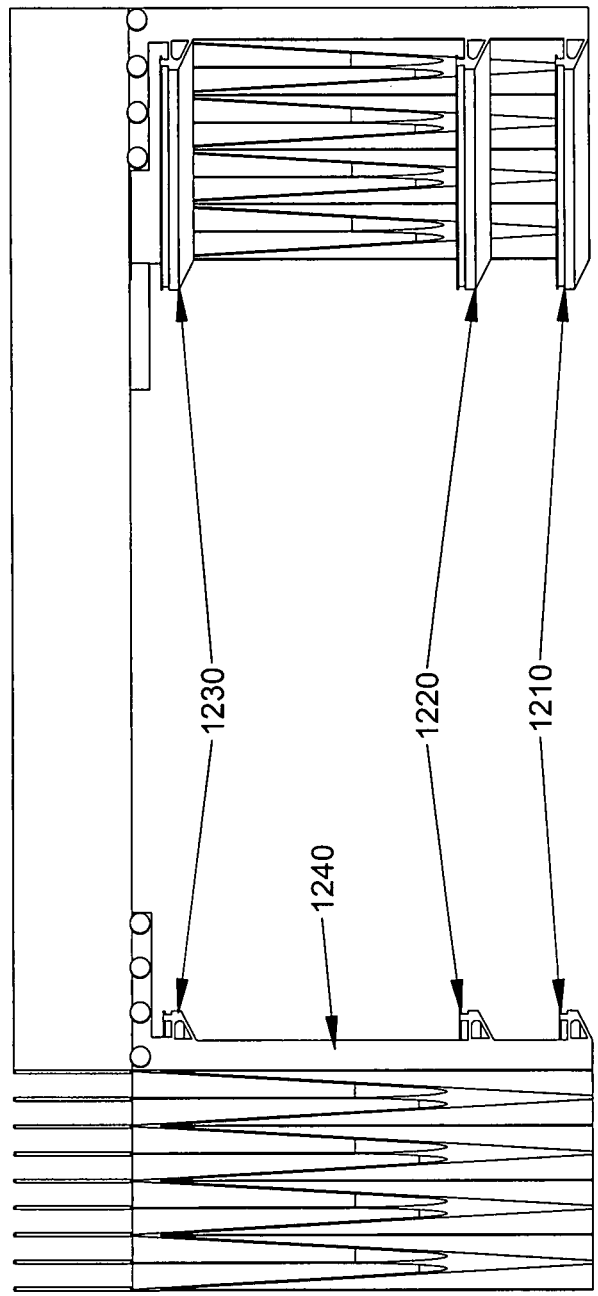
FIG. 12 is an angled view of the overhead truss apparatus that supports the hoists that lift cargo off of a docked ship and deposits them on container carriages.

One embodiment of the overhead truss apparatus is shown in FIG. 12 as viewed from an angle. The drawing shows the lower lateral rails 1210 and the intermediate lateral rails 1220, both of which are able to simultaneously carry railed carriages to the storing or staging area. The upper lateral rails 1230 provide movement of the hoists that are used to load and unload the docked vessels. All of the lateral rails are mounted to the overhead cargo transfer apparatus 1240.

The unload cycle time is minimized as compared to traditional unloading means where a freight crane lifts a container off of the ship, rotates the container, and transports it all the way to a staging area adjacent to the docked ship that can be located far below the deck of the vessel. This process can be automated in the invention to enable the hoist operator to manage, monitor, and control multiple hoist assemblies. The operator can also be located remotely from the cargo handling operation on the port, and it is envisioned that a centralized control center is established in the port that can remotely control and direct cargo handling operations with auxiliary local control stations at each dock. Various levels of control are possible over the different cargo handling systems that includes the truss system, the rail carriage system, and the elevator system, ranging from fully autonomous or automatic to remote human-controlled interfaces.

Elevators are located at the end of the rail carriage system that can lift the rail carriage and the container up or down for transfer to the appropriate storage or staging area. High priority containers can be diverted during this process to allow the containers to pass through to the center freight handling section. The overhead truss apparatus can support multiple rail systems and hoists to maximize loading and unloading cycle times. This cargo transfer system is easily applied to land-based facilities. Indeed, a large portion of the docking port can be modified to become an addition to a land-based port to facilitate the consistent and efficient transfer of cargo. A rail system can also connect to land-based cargo facilities.

Methods of keeping the docking port stationary in a geographically constant position can be accomplished in a variety of ways. Some of the other embodiments include dynamic anchoring, seabed anchors, large sea kite anchors, or even components physically engaged on the sea floor, such as might be possible with modifications to the float projector. The location of the docking port and specific environmental and strategic objectives will dictate the embodiment of this feature. A vessel located in an area that is historically susceptible to hurricanes will require a certain mobility to allow it to be relocated on short notice. A military supply vessel may also require mobility as well as the ability to interact with large aircraft and submarines, in addition to large and small ships.

Mobility factors likely will depend on the nature of the use of the docking port: military or civilian. Nuclear power may be used in military applications and enable the docking port to travel at relatively high speeds. A civilian docking port will not likely require such mobility and can be delivered to its predetermined location by tugboat and take advantage of some of the semi-permanent anchoring systems available.

One application of the invention has the docking port being used as a civilian offshore mobile port of entry. Customs operations, as well as inspections, could be conducted on an offshore environment. This would allow previously uninspected cargo container to be inspected prior to reaching the continental United States. After containers are cleared for entry into the country by customs, the containers would then be reloaded onto smaller vessels for transport to various destination ports.

The presence of an independent automated cargo handling system can be of great use for many countries as well as military operations. Cargo and container handling from sea vessel to land can be extremely difficult and highly dependent upon the equipment present at a ship's unloading point. The fully automated cargo distribution system in the docking port can be equipped with special unloading equipment to extract contents of a container quickly and with minimal labor. An automated inventory system can move freight pallets to and from storage areas. Other specialized cargo functions can be performed based upon the particular circumstances encountered.

Figure 13:
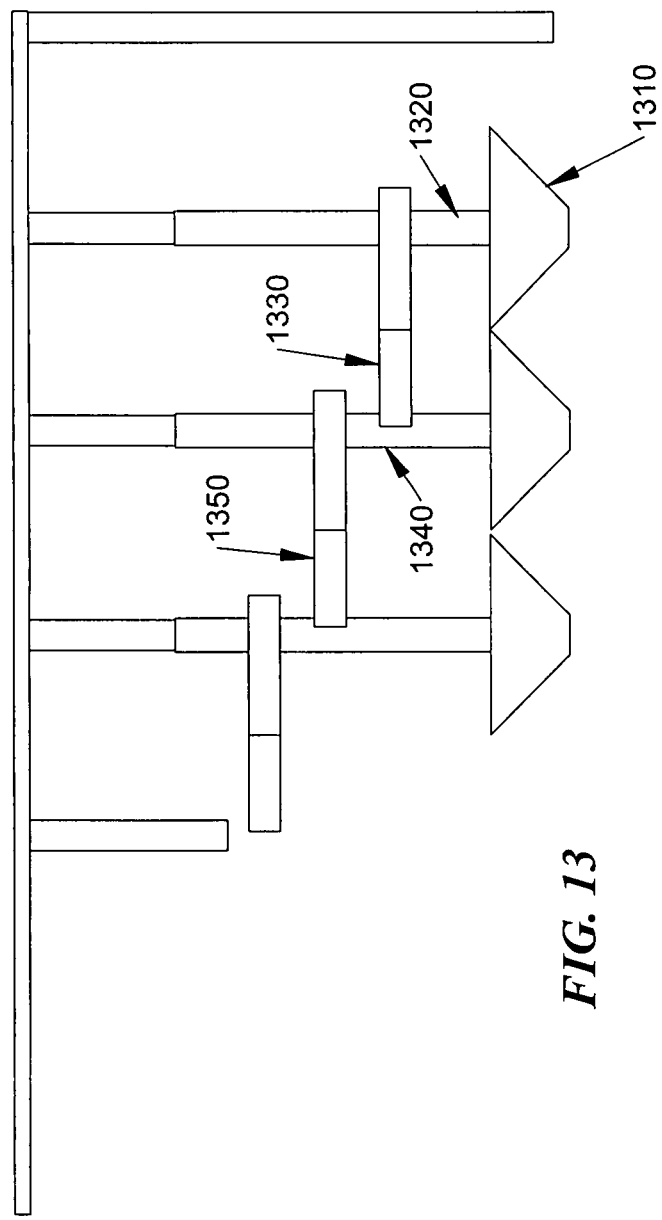
FIG. 13 is a close up view of the sequential wave pistons that can be located at the sides of the docking port to convert wave energy into usable power.

Another objective of this invention is to convert energy from waves into energy that can be put to use on the docking port. One embodiment, as shown in FIG. 13, uses independent wave pistons that are situated in multiple rows around the perimeter of the docking vessel to capture energy from the ocean waves. The telescopic (i.e., extendible or compressible by sliding overlapping sections) pistons move up and down independently of the docking port as waves arrive. When the wave hits the piston head 1310, it rises, pushing water or another fluid up inside the piston body 1320. The wave energy can then be converted into useable power in a number of ways. Sequential lifting can be accomplished as water or another fluid is pushed up from the piston body 1320 into a tank 1330 attached to the piston 1320 and the adjacent piston 1340. One-way valves prevent the water or other fluid from returning to the original piston 1310. As the wave motion progresses along the bottom of the docking port, the wave actuates the adjacent piston 1340, which correspondingly pushes water or another fluid into the next higher tank 1350. The rise and fall of each unit can pump water or another fluid up to an upper holding tank where it is released through a turbine to generate power. Multiple rows of pistons allow such productive pumping regardless of wave direction. When a wave has passed, the outer float falls and new water or another fluid refills the chamber. Wave energy is absorbed, which contributes to the stability of the docking vessel Another embodiment of the invention allows the pistons to pump the water or other fluid into troughs at a predetermined elevation. This simplified embodiment would not require a complicated staggered and sequential piping system as water or another fluid is pumped up to the deck level and falls down to drive a turbine. This may provide for more predictable power generation as wave energy is captured and transferred to a central location to be converted to usable energy.

In addition to fluid power turbines, linear generators that convert linear wave motion into useful electrical energy can also be used. The wave motion can also be used to compress air. A variety of alternatives or modifications are available depending on the power generation needs to be satisfied.

Figure 14:
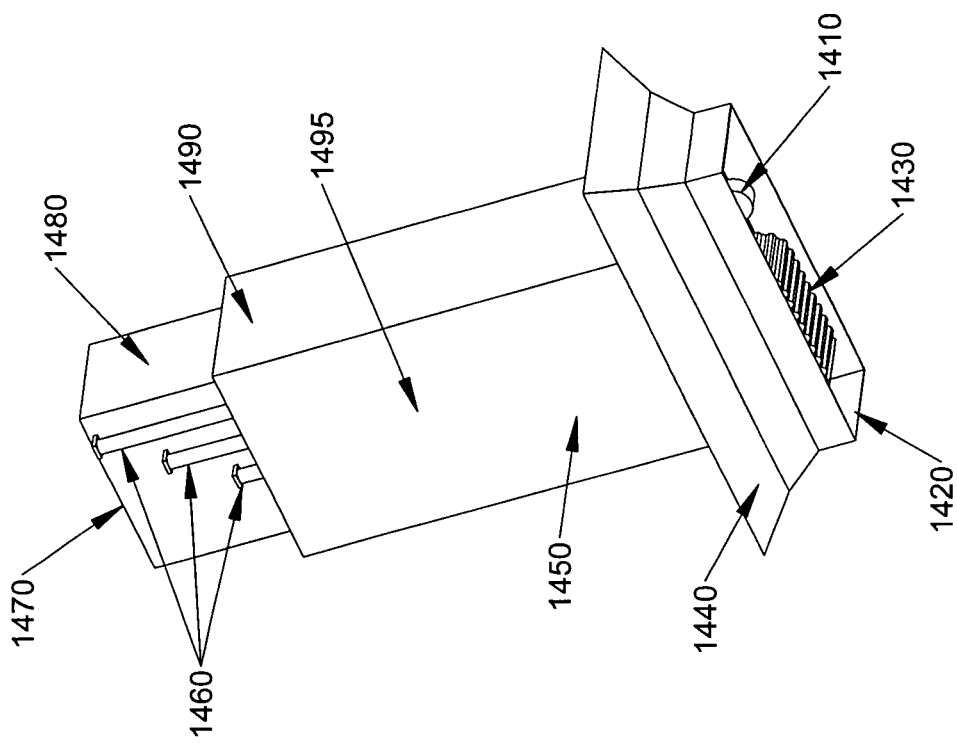
FIG. 14 shows one embodiment of the flotation projector with propulsion capabilities that can be located at the corners of the docking port or at other locations as needed.

Another embodiment of the invention provides for a combination suspension and power generation system, as shown in FIG. 14, which can be located at the four corners of the docking port. The float projection provides mechanical power to a belt drive propulsion system in the same manner as the pistons located on the side of the docking port. The open-bottomed enclosure 1420 contains one or more belt drives 1430 as well as a fluid power drive turbine 1410 used to power the drives. Attached immediately above the enclosure is a water chamber 1450 that contains floating pistons 1460. When a wave acts on the wave-engaging hull 1440, the water chamber 1450 is lifted upward, pushing water up around the pistons. As the water rises, the buoyancy of the piston is increased, which causes the floating chamber to sit lower in the water.

The upper portion of the chamber serves as the water holding tank 1495 to contain the water between the progressive stages. Pistons 1460 are arranged in an escalating configuration in order to pump water or another fluid higher from one station to the next. The pistons can be 8 foot in diameter with a 2-inch side clearance, which are capable of pumping 420 gallons of water per foot of vertical movement. Once the water or other fluid reaches the top level holding tank 1490, it feeds the fluid power turbine 1410 used to power the belt drive propulsion system. This power generation system attaches to the docking port at the top of the unit 1470, which can also include a cargo hold 1480.

Because the volume of water or other fluid displaced by the piston increases rapidly, it can be discharged through a selected port. In this way, the water lift can be far greater than the wave height. A large port may have many chambers and perhaps a third of these would be used to meet flotation needs of the vessel. Chambers that are above the median wave height would support the vessel in this way, while chambers below this level would be refilled with water from the adjoining waters or from fluid discharge from immediately lower chambers. The discharge point and the number of stages could be adjusted depending on environmental conditions.

The telescopic nature of the float projector can also allow for extension of the member down onto the ocean floor. In this way, it could provide support for the docking port in shallow waters. Access to a fully extended float projector would also facilitate any repairs on the unit that become necessary.

While the invention has been particularly shown and described with respect to preferred embodiments, it will be readily understood that minor changes in the details of the invention may be made without departing from the spirit of the invention.

Having described the invention, I claim:

1. An offshore semisubmersible docking port structure for loading and unloading of cargo, comprising:
   one or more separate protective docking enclosures where vessels dock and are raised above sea level in an enclosed wave pan to isolate the vessel from wave action;
   an overhead truss system spanning at least some portion of the lateral width and at least some portion of the longitudinal length of the docking enclosure for moving one or more cargo containers to an associated rail transport system, said overhead truss system allowing vertical movement of said one or more cargo containers and lateral and longitudinal movement of said one or more cargo containers in said docking enclosure;
   said rail transport system connected to a cargo storage area where said one or more cargo containers can be stored after unloading from a vessel or before loading onto a vessel;
   a semisubmersible flotation system that provides some or all of the docking flotation requirements of the port; and
   one or more wave energy conversion and control pillars that stabilize the port and produce usable energy, said wave energy conversion and control pillars having a plurality of independent telescopic wave pistons situated on the perimeter of the docking port to provide stability to said docking port and to convert wave energy by interacting with other independent telescopic wave pistons located on said pillars on the docking unit, said conversion and control pillars providing power to a drive turbine to provide usable energy and propulsion to the docking port.

2. The offshore semisubmersible docking port structure for loading and unloading of cargo of claim 1, further comprising:
   a watertight barrier to the ocean creating an enclosure that isolates the docked vessel from the ocean; and
   a mechanism used to vertically lift said docked vessel above the ocean wave height, creating a downward force on the docking port causing tension on the port that stabilizes the docked vessel.

3. The offshore semisubmersible docking port structure for loading and unloading of cargo of claim 2, further comprising:
   a cable lifting system for lifting a vessel enclosure that includes a wave pan, and lifting to a level where the edge is above the wave height, said cable lifting system attached to the edges of said wave pan.

4. The offshore semisubmersible docking port structure for loading and unloading of cargo of claim 2, further comprising:
   a water pump system for lifting a docked vessel to a height above the mean ocean height.

5. The offshore semisubmersible docking port structure for loading and unloading of cargo of claim 1, further comprising:
   a sequential staggered wave pump piston system used to generate power for the structure that includes a displacer with a fluid chamber permitting fluid to rise and exit at a desired level.

6. The offshore semisubmersible docking port structure for loading and unloading of cargo of claim 5, further comprising:
   the pump piston system employing sequential lifting as wave action moves a piston head up and down to push fluid up into an elevated tank; and
   a turbine positioned to be driven and produce power as said fluid is released from the elevated tank.

7. The offshore semisubmersible docking port structure for loading and unloading of cargo of claim 5, further comprising:
   the pump piston system pumping fluid into troughs positioned at predetermined elevations; and
   a turbine positioned to be driven and produce power as said fluid is released from the elevated troughs.

8. The offshore semisubmersible docking port structure for loading and unloading of cargo of claim 5, wherein the pump piston system is part of the port support or suspension.

9. The offshore semisubmersible docking port structure for loading and unloading of cargo of claim 1, further comprising:
   a linear generator operated by wave action to generate power.

10. The offshore semisubmersible docking port structure for loading and unloading of cargo of claim 1, further comprising:
    vertical support for the dock provided by floating pillars, with multiple pillars embedded with a pump piston system and multiple displacers allowing fluid to rise and fall with wave action.

11. The offshore semisubmersible docking port structure for loading and unloading of cargo of claim 1, further comprising:
    the overhead truss system supporting multiple lifting hoist assemblies moving along the truss system, said truss system operating on either side of a docked vessel;
    the multiple hoist assemblies moving laterally on the truss system, and said truss system capable of longitudinal movement along at least a portion of the length of a docked vessel;
    an associated elevated rail system capable of transporting containerized and palletized cargo between the truss system and cargo storage areas within said dock;
    a computer control interface able to control and automate aspects of the cargo handling system; and
    cargo unloading and loading operations occurring concurrently.

12. The offshore semisubmersible docking port structure for loading and unloading of cargo of claim 11, further comprising:
    a hoist unit on the truss system lifts the cargo to a predetermined point where a carriage on the rail system positions underneath the cargo, at which time the hoist unit moves the cargo onto the carriage and uncouples from the cargo; and said carriage transports the cargo to an associated elevator to be moved to another location.

13. The offshore semisubmersible docking port structure for loading and unloading of cargo of claim 11, further comprising:

a dockside rail system.

14. The offshore semisubmersible docking port structure for loading and unloading of cargo of claim 11, further comprising:

the rail system integrated into the overhead truss system with at least two levels of lateral rails supporting cargo carriage movement.

15. A system for providing power to an artificial semisubmersible docking structure on the ocean surface, comprising:

a sequential staggered discharge height wave displacement pump piston system employing a series of displacing bodies located on the periphery of the docking unit which move up and down independently from each other with wave action in a flotation unit with an internal fluid filled cylinder configured to closely fit the displacer so as to lift the internal fluid level to an elevated storage position;

a drive turbine positioned to be driven as said fluid is released from the elevated storage position and powers said drive turbine, said drive turbine producing usable energy for the docking structure and propulsion of the docking structure in the water; and a docking port for isolating and docking a vessel to prevent wave effects on the vessel while it is loaded or off-loaded with cargo, said cargo loaded and unloaded using a computer controlled overhead truss system to move cargo between the truss system and a computer controlled rail carriage system moving cargo between the docking location and a cargo staging location.

16. The system for providing power to an artificial semisubmersible docking structure on the ocean surface of claim 15, further comprising:

a linear generator operated by wave action to generate power.

17. The system for providing power to an artificial semisubmersible structure of claim 15 using ocean wave action, further comprising:

using a sequential staggered wave pump piston system to move a piston head up and down in response to wave movement providing a pumping force to pump fluid to an elevated storage position;

positioning a turbine to be driven and produce electricity as said fluid is released from the elevated storage position; and operating a docking facility at the artificial structure with protective docking ports isolating docked vessels from wave movement to load or unload cargo, said cargo loaded and unloaded using a computer controlled overhead truss system to move cargo between the truss system and a computer controlled rail carriage system moving cargo between a docking port location and a cargo staging location.

18. An offshore semisubmersible docking port structure for loading and unloading of cargo, comprising:

one or more separate protective docking enclosures where vessels dock and are raised above sea level in an enclosed wave pan to isolate the vessel from wave action;

an overhead truss system spanning at least some portion of the lateral width and at least some portion of the longitudinal length of the docking enclosure for for moving of one or more cargo containers to an associated rail transport system, said overhead truss system allowing vertical movement of said one or more cargo containers and lateral and longitudinal movement of said one or more cargo containers in said docking enclosure;

a mechanism coupled to said overhead truss used to vertically lift said docked vessel above the ocean wave height, creating a downward force on the docking port causing tension on the port that stabilizes the docked vessel;

said rail transport system connected to a cargo storage area where said one or more cargo containers can be stored after unloading from a vessel or before loading onto a vessel;

a semisubmersible flotation system that provides some or all of the docking flotation requirements of the port; and one or more wave energy conversion and control pillars that stabilize the port and produce usable energy, said wave energy conversion and control pillars having a plurality of independent telescopic wave pistons situated on the perimeter of the docking port to provide stability to said docking port and to convert wave energy by interacting with other independent telescopic wave pistons located on said pillars on the docking unit, said conversion and control pillars providing power to a drive turbine to provide usable energy and propulsion to the docking port; and said wave energy conversion and control system having a sequential staggered wave pump piston system used to generate power for the structure that includes a displacer with a fluid chamber permitting fluid to rise and exit at a desired level.

19. The offshore semisubmersible docking port structure for loading and unloading of cargo of claim 18, further comprising:

a cable lifting system for lifting a vessel enclosure that includes a wave pan, and lifting to a level where the edge is above the wave height, said cable lifting system attached to the edges of said wave pan.

20. The offshore semisubmersible docking port structure for loading and unloading of cargo of claim 18, further comprising:

the pump piston system employing sequential lifting as wave action moves a piston head up and down to push fluid up into an elevated tank; and a turbine positioned to be driven and produce power as said fluid is released from the elevated tank.

* * * * *

UNITED STATES PATENT AND TRADEMARK OFFICE
CERTIFICATE OF CORRECTION

PATENT NO.         : 8,858,149 B2                                   Page 1 of 1
APPLICATION NO.    : 12/227755
DATED              : October 14, 2014
INVENTOR(S)        : David Murray Munson, Jr.

It is certified that error appears in the above-identified patent and that said Letters Patent is hereby corrected as shown below:

In the Specification

Col. 1, line 30, delete "a the" and replace with "the"

Col. 1, Line 37, delete "as" and replace with "has"

Signed and Sealed this
Seventh Day of April, 2015

Michelle K. Lee
*Director of the United States Patent and Trademark Office*